United States Patent Office 3,211,475
Patented Oct. 12, 1965

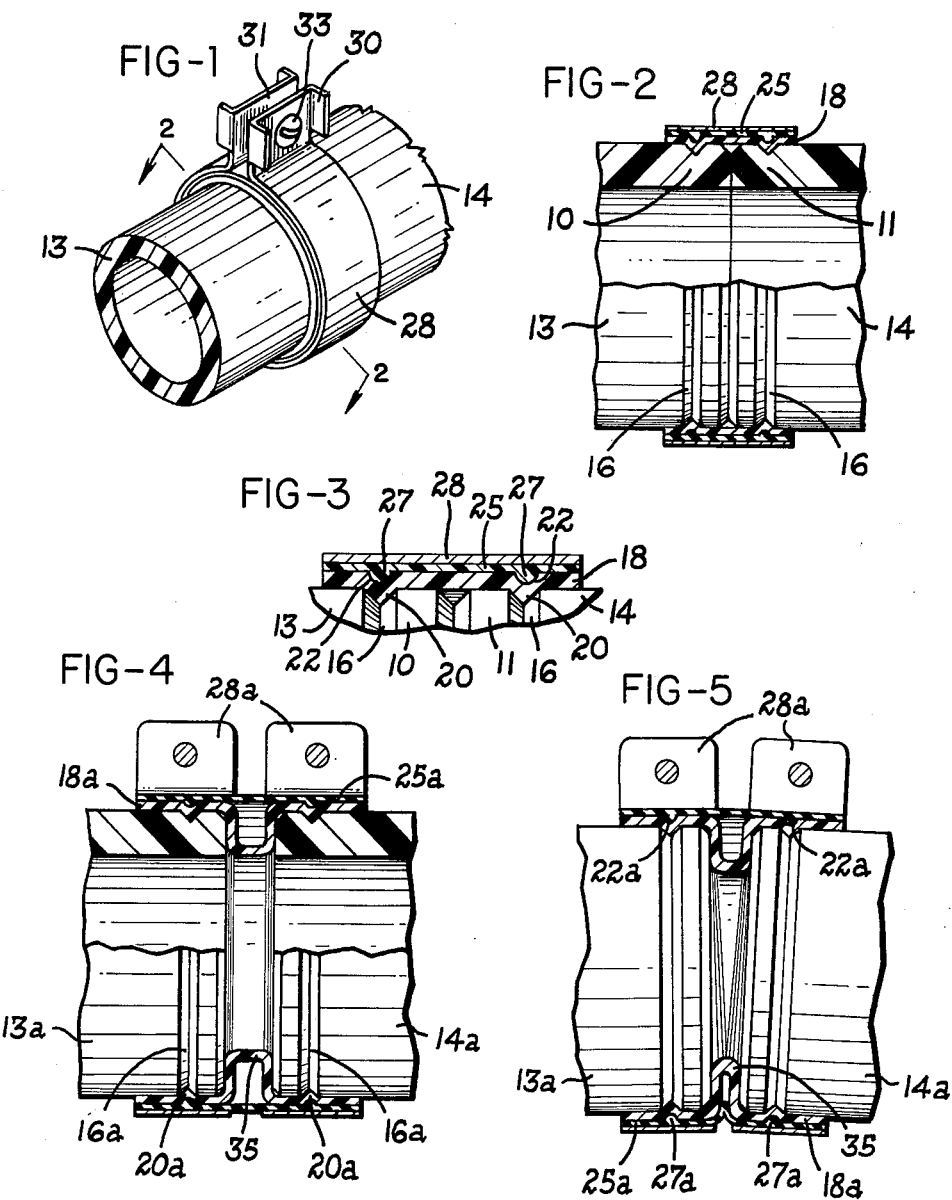

3,211,475
FLEXIBLE PIPE COUPLING
Jacob B. Freed and Arthur B. Brinkel, Jr., Dayton, Ohio, assignors to The Duriron Company, Inc., Dayton, Ohio, a corporation of New York
Filed Aug. 28, 1962, Ser. No. 219,937
6 Claims. (Cl. 285—229)

This invention relates to joints for pipes and the like, and particularly to devices for interconnecting the ends of tubular members in a fluid tight and force resisting manner.

An important object of this invention is to provide coupling apparatus which interconnects a pair of fluid conduits or the like in a fluid tight manner capable of also withstanding substantial tension forces in an axial direction without adverse effects.

Another object of this invention is to provide a coupling device or pipe joint for interconnecting the ends of two pieces of pipe or the like without requiring the use of threaded connections, thus permitting use of the invention on pipes of materials which are not suitable for threading, and particularly to a coupling of the aforesaid type which requires no special tools to assemble, is simple in construction, is resistant to corrosion and capable of cold flowing so that the fluid tight and force resistant characteristics of the apparatus are enhanced after assembly, and which forms a secure joint between the pipes.

A further object of this invention is to provide a flexible coupling and joint which can be used regardless of misalignment between the two tubular pipe members, and which also permits these members to move about an angle to the axis of the coupling while providing a fluid tight joint which is capable of resisting axial forces tending to separate the joint.

Other objects and advantages of the invention will be apparent from the following description, the accompanying drawings and the appended claims.

In the drawings:

FIG. 1 is a perspective view of the rigid coupling apparatus of the present invention;

FIG. 2 is a side view, partially in section, of the coupling apparatus shown in FIG. 1;

FIG. 3 is an enlarged fragmentary sectional view illustrating the various components of the invention;

FIG. 4 is a side view, partially in section, illustrating a flexible coupling in accordance with the invention; and FIG. 5 is a view similar to FIG. 4 but showing the pipe members in solid lines and in a misaligned position.

Referring to the drawings, which illustrate preferred embodiments of the invention, FIGS. 1–3 show a rigid pipe joint or coupling for securely interconnecting the end portions 10 and 11 of the tubular members or pipes 13 and 14. These tubular members can be made of any substantially rigid material, such as plastic, wood, or metal, and the invention contemplates use with solid cylindrical members, as well as the tubular members. As shown best in FIG. 3, each of the pipes 13 and 14 has a circumferential V-shaped groove 16 cut in its exterior surface a predetermined distance from the end of the pipe. While the preferred cross-sectional configuration of these grooves 16 is V-shaped, it is within the scope of this invention to use other cross-sectional configurations, such as a semi-circular shape, so long as they substantially fulfill the hereinafter described functional characteristics.

The pipes 13 and 14 are interconnected by a tubular sleeve 18 having a length sufficient to overlap the grooves 16 when the sleeve is slipped over each of the end portions, as shown in FIG. 3. The sleeve 18 is preferably constructed of a polyethylene resin material, namely, polytetrafluoroethylene and its interpolymers and copolymers, commercially available under the name Teflon. This material provides the advantages of complete inertness in the presence of corrosive fluids including solvents, self-lubricating properties, toughness and resistance to physical wear and abrasion, use over a wide temperature range, and the ability to be cold worked under pressure.

The inside diameter of the sleeve 18 is preferably slightly less than the outside diameter of the pipes so that the sleeve will fit snugly on the end portions 10 and 11, although the invention will function quite satisfactorily if the inside diameter of the sleeve 18 is equal to or slightly greater than the outside diameter of the end portions 10 and 11. A pair of complementary V-shaped projections 20 are formed circumferentially around the inside surface of the sleeve 18 and are spaced apart a distance equal to the spacing between the grooves 16 in the end portions 13 and 14 when the latter are placed end to end, as shown in FIG. 3. As indicated, the projections 20 have a size and shape so that they will engage the grooves 16 in the pipes 13 and 14 when the sleeve 18 is slipped thereonto. Thus the cross-sectional configuration of the projections 20 preferably correspond to the shape of the grooves 16 so that maximum initial engagement is achieved therebetween.

Since the sleeve 18 and the integral projections 20 are constructed of polytetrafluoroethylene, they are somewhat resilient and will temporarily deform as the sleeve 18 is slipped onto the pipes 13 and 14 so that the projections 20 do not offer any substantial resistance to assembly. The projections 20 are formed by rolling the configuration into the polytetrafluoroethylene sleeve material 18 after the latter has been extruded in the usual manner, and such rolling operation creates a pair of circumferential depressions 22 in the exterior surface of the sleeves opposite the projections 20.

Wrapped around the outside of the sleeve 18 is a joint cover 25 made from a resilient material, such as rubber or neoprene, and having an axial length preferably equal to that of the sleeve 18 and an unstressed internal diameter somewhat less than that of the outer diameter of the sleeve 18 so that when this cover is placed around the sleeve 18 it will fit snugly thereon. A pair of circumferential beads 27 are formed, preferably by molding, on the inner surface of the cover for engagement with the depressions 22 to control the cold flow of the sleeve material, as will be explained. Hereagain the cross-section configuration of the beads 27 are complementary with the cross-section of the depression 22 and are preferably a little larger in cross-sectional area so that they more than fill the depressions 22.

Surrounding the cover 25 is a conventional clamp device 28 preferably constructed of metal and having an axial length substantially equal to the cover 25 and sleeve 18 since cooperation between these three members is limited essentially to the areas in which they mutually overlap one another. The clamp 28 includes a circumferential band portion having two radially upwardly extending flanges 30 and 31 each with an aperture therein for receiving the conventional screw 33 which cooperates with a nut in the usual manner to urge the flanges together when the nut is tightened thus exerting a radial pressure on the resilient cover 25, the sleeve 18, and the pipes 13 and 14.

As the clamp 28 is tightened, the pressure exerted thereby is evenly distributed by the resilient cover 25 so that there is a substantially even distribution of the clamping pressure on the outer surface of the sleeve 18, thus resulting in complete fluid tight contact between the adjacent surfaces of the sleeve 18 and the pipes 13 and 14. The over-sized beads 27 on the cover 25 are forced into the depressions 22 causing the polytetrafluoroethylene material of the sleeve 18 and the projections 20 to cold-flow into intimate and substantial contact with the grooves 16 formed in the pipes 10 and 11 thus creating a fluid tight joint capable of resisting substantial tension forces in an axial direction while effecting a coupling which is substantially rigid.

The flexible coupling embodiment of the invention is shown in FIGS. 4 and 5, and includes the pipes 13a and 14a each having a circumferential groove 16a which is engaged by the projections 20a in the sleeve 18a in substantially the same manner as the FIGS. 1–3 embodiment. However, the sleeve 18a has a flexible intermediate portion or loop 35 which extends radially inwardly and provides a spacer between the ends of the pipes, as well as a flexible joint therebetween.

The resilient cover 25a is coextensive with the sleeve 18a and includes the beads 27a on the internal surface thereof for engaging the depressions or grooves 22a in the sleeve 18a. The cover 25a spans the gap between the pipe ends and above the flexible portion 35 (see FIG. 4) so that should the flexible portion 35 commence leaking, the cover would provide a suitable backup seal, in addition to the other functions thereof described above in connection with the rigid embodiment of FIGS. 1–3.

The flexible loops 35 may have other configurations than the square U-shape as shown, and it would be possible to use a bellows arrangement having a plurality of such loops without departing from the scope of the invention.

Two separate metal clamps 28a are utilized, one around the end of each pipe for carrying out the functions described above with reference to the clamp 28. Thus the clamps exert a pressure on the resilient cover 25a which evenly distributes this pressure over the area of contact with the sleeve 18a causing the adjacent surface of the tubular member or pipes 13 and 14a and the sleeve 18a to be forced into fluid tight contact. Similarly, the beads 27a on the cover 25a are forced into the depression 22a in the sleeve 18a causing the polytetrafluoroethylene projections 20a to cold-flow into the grooves 16a in the pipes so that there is intimate contact between the projections and the grooves for offering maximum resistance to axial separation of the joint. In operation, when one pipe 13 is moved from axial alignment with the other pipe 14, as shown in FIG. 5, the flexible portion 35 in the sleeve buckles thus accommodating such misalignment. Similarly, the resilient cover 25a stretches in the area between the clamps 28a so that it does not restrict the flexibility of the sleeve 18a. It should also now be apparent that, in addition to the flexible feature, this embodiment includes the important fluid tight and resistance to axial separation features of the FIGS. 1–3 embodiment.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Coupling apparatus for interconnecting a pair of tubular members each having a circumferential groove spaced a predetermined distance from one end thereof, comprising a flexible sleeve having a substantially uniform wall thickness and an inner diameter substantially equal to the outer diameter of the tubular members for surrounding engagement with an end portion of each member, at least two circumferential projections in the internal surface of said sleeve spaced apart a distance equal to at least twice the predetermined distance so that said projections engage said grooves when said sleeve is placed on the members, a circumferential depression in the exterior surface of said sleeve opposite each said projections, a tubular cover of resilient material superimposed around said sleeve and having an axial length greater than twice said predetermined distance for overlying the surface of said sleeve above said projections, at least two complementary beads on the inner surface of said cover for engagement with said depressions, and clamp means around said cover for imparting clamping pressure to said cover which evenly distributes said pressure over the entire area of contact between said projections and the members so that fluid tight contact is created therebetween and said beads are forced into said depressions causing said projections to cold-flow into intimate contact with said grooves thus preventing axial separation of the tubular members from the sleeve.

2. Coupling apparatus for interconnecting a pair of tubular members each having a circumferential groove spaced a predetermined distance from one end thereof, comprising a polytetrafluoroethylene sleeve having a substantially uniform wall thickness and an inner diameter substantially equal to the outer diameter of the tubular members for surrounding an end portion of each member, at least two circumferential projections formed in the internal surface of said sleeve spaced apart a distance equal to twice said predetermined distance so that said projections engage said grooves when said sleeve is placed on the members, a circumferential depression in the exterior surface of said sleeve opposite said projections, a tubular cover of resilient material superimposed around said sleeve and having an axial length greater than twice said predetermined distance for overlying the surface of said sleeve opposite said projections, at least two complementary beads on the inner surface of said cover for engagement with said depressions, said cover having an unstressed inside diameter no greater than the outer diameter of said sleeve, and a metal clamp surrounding said cover for imparting a clamping pressure thereto which is evenly distributed over the entire area of contact between said sleeve and the member so that said beads cause said projections to cold-flow into intimate contact with said grooves and so that fluid tight contact is provided between adjacent surfaces of the tubular members and said sleeve.

3. Coupling apparatus for flexibly interconnecting the ends of a pair of tubular members each having an external circumferential groove spaced a predetermined distance from one end thereof, comprising a polytetrafluoroethylene sleeve having a substantially uniform wall thickness and end portions with internal diameters substantially equal to the outside diameters of said members for overlapping the ends thereof, at least two circumferential complementary projections in the inner surfaces of said sleeve for engagement with said grooves in the members, a depression in the outer surface of the said sleeve opposite each of said projections, said sleeve having a flexible portion intermediate said end portions for spacing the ends of the tubular members apart and for permitting misalignment between the ends of the tubular member, a tubular cover of resilient material superimposed around said sleeve and having internal beads thereon which engage said depressions in said sleeve, and positive clamping means around each end of said cover above said beads and said end portions for forcing said beads into said depression thereby forcing said polytetrafluoroethylene projections into intimate contact with said grooves to prevent axial separation of said sleeve and said members.

4. Coupling apparatus for flexibly interconnecting the ends of a pair of substantially rigid tubular members each having an external circumferential groove spaced a predetermined distance from one end thereof, comprising a polytetrafluoroethylene sleeve having a substantially uniform wall thickness and end portions with internal diameters substantially equal to the outside diameter of said members for overlapping the ends thereof, at least two circumferential complementary projections on the inner surface of said sleeve spaced apart for simultaneous engagement with said grooves in the members, a depression in the outer surface of the said sleeve opposite each of said projections, said sleeve having a radially inwardly extending U-shaped portion intermediate said end portions for spacing the ends of the tubular members apart a predetermined distance and for permitting flexing of said sleeve, a resilient tubular cover wrapped around said sleeve and having an axial length substantially equal to said sleeve, internal beads on said cover for engaging said depressions, and a positive clamping means around said end portions for forcing said beads into said depressions in said sleeve and said polytetrafluoroethylene projections into intimate contact with said grooves to prevent axial separation of said sleeve and said members, said cover effecting the even distribution of the clamping pressure over the entire area of contact between said sleeve and the members to provide a fluid tight joint between said members.

5. Coupling apparatus for interconnecting a pair of tubular members each having a V-shaped circumferential groove spaced a predetermined distance from one end thereof, comprising a flexible sleeve formed from a corrosive resistant material with substantially uniform wall thickness and having an inner diameter substantially equal to the outer diameter of the tubular members for surrounding engagement with an end portion of each member, a pair of circumferential V-shaped projections in the internal surface of said sleeve spaced apart a distance equal to at least twice the predetermined distance so that said projections engage said grooves when said sleeve is placed on the members, a generally U-shaped circumferential depression in the exterior surface of said sleeve opposite each said projections, a tubular cover of resilient material superimposed around said sleeve and having an axial length greater than twice said predetermined distance for overlying the surface of said sleeve above said projections, a pair of U-shaped complementary beads on the inner surface of said cover for engagement with said depressions, and a metal clamp around said cover for imparting clamping pressure to said cover which evenly distributes and concentrates said pressure over the entire area of contact between said sleeve and the members so that fluid tight contact is created therebetween and said beads are forced into said depressions causing said projections to cold flow into intimate contact with said grooves thus preventing axial separation of the tubular members from the sleeve.

6. Coupling apparatus for interconnecting a pair of tubular members each having a V-shaped circumferential groove spaced a predetermined distance from one end thereof, comprising a flexible sleeve formed from a corrosive resistant material with substantially uniform wall thickness and having an inner diameter substantially equal to the outer diameter of the tubular members for surrounding engagement with an end portion of each member, a pair of circumferential V-shaped projections in the internal surface of said sleeve spaced apart a distance equal to at least twice the predetermined distance so that said projections engage said grooves when said sleeve is placed on the members, a generally U-shaped circumferential depression in the exterior surface of said sleeve opposite each said projections, tubular cover members of resilient material superimposed around said sleeve for overlying the surface of said sleeve around said projections, a pair of annular U-shaped complementary beads on the inner surface of said cover for engagement with said depressions, and a metal clamp around said cover for imparting clamping pressure to said cover which evenly distributes and concentrates said pressure over the entire area of contact between said sleeve and the members so that fluid tight contact is created therebetween and said beads are forced into said depressions causing said projections to cold flow into intimate contact with said grooves thus preventing axial separation of the tubular members from the sleeve.

References Cited by the Examiner

UNITED STATES PATENTS

| 1,829,236 | 10/31 | Perkins | 285—236 |
| 2,116,165 | 5/38 | Ullman | 285—419 |
| 2,159,150 | 5/39 | Heintz | 285—236 |
| 2,261,948 | 11/41 | Beach | 285—236 |
| 2,451,438 | 10/48 | Hartman | 285—236 |
| 3,016,161 | 1/62 | Peplin | 285—236 |
| 3,100,658 | 8/63 | Miller | 285—235 |
| 3,104,898 | 9/63 | MacDonald | 285—236 |

FOREIGN PATENTS

| 550,990 | 2/43 | Great Britain. |

CARL W. TOMLIN, *Primary Examiner.*